T. V. ELLIOTT.
TIRE.
APPLICATION FILED JAN. 29, 1916.
1,226,320.
Patented May 15, 1917.
2 SHEETS—SHEET 1.
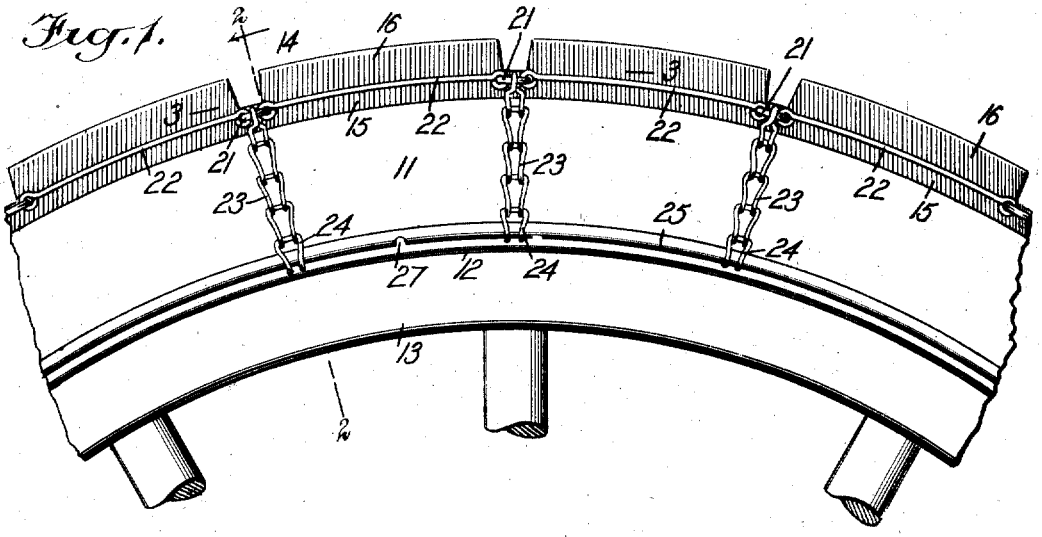
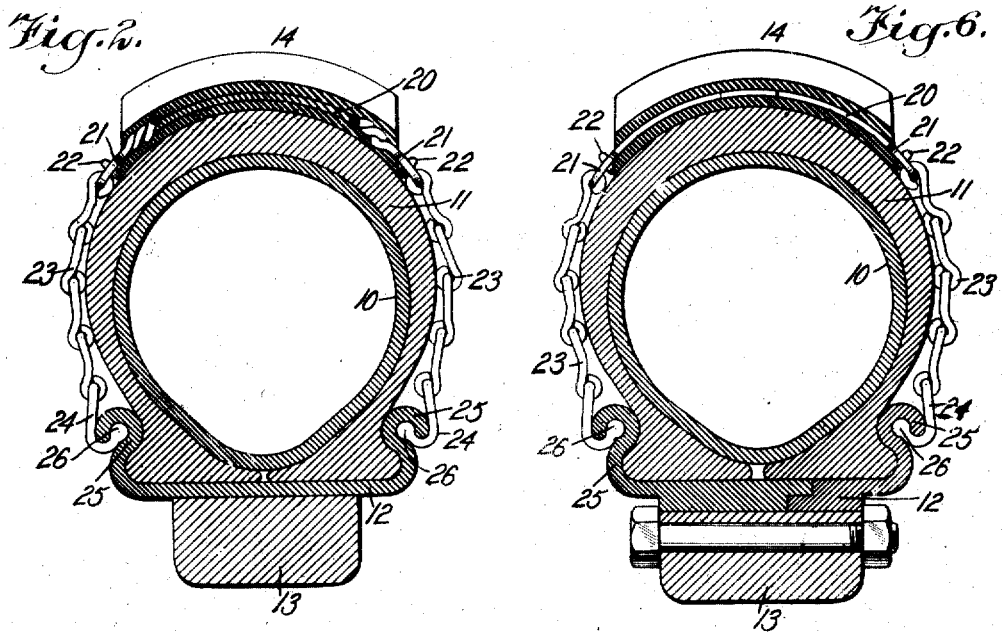
WITNESSES
INVENTOR
Thaddious V. Elliott
BY
ATTORNEYS

T. V. ELLIOTT.
TIRE.
APPLICATION FILED JAN. 29, 1916.

1,226,320.

Patented May 15, 1917.
2 SHEETS—SHEET 2.

WITNESSES

INVENTOR
Thaddious V. Elliott
BY
ATTORNEYS

UNITED STATES PATENT OFFICE.

THADDIOUS V. ELLIOTT, OF NEW YORK, N. Y., ASSIGNOR TO ELLIOTT RIM CHAIN & TREAD CORPORATION, OF ESOPUS, NEW YORK, A CORPORATION OF NEW YORK.

TIRE.

1,226,320.

Specification of Letters Patent.

Patented May 15, 1917.

Application filed January 29, 1916. Serial No. 75,018.

*To all whom it may concern:*

Be it known that I, THADDIOUS V. ELLIOTT, a citizen of the United States, and a resident of the city of New York, borough of Manhattan, in the county and State of New York, have invented a new and Improved Tire, of which the following is a full, clear, and exact description.

The invention relates to pneumatic tired wheels for automobiles and similar vehicles having a shoe and an inner tube.

The object of the invention is to provide a new and improved tire arranged to permit convenient removal of the tread when worn out, and replacing the same by a new one, to prevent puncturing of the shoe and inner tube and to relieve the shoe of all undue strains.

In order to accomplish the desired result, use is made of a tread removably overlying the peripheral face of the shoe of the tire, and a fastening device permanently associated with the tread and having side members removably engaging the rim of the wheel.

A practical embodiment of the invention is represented in the accompanying drawings forming a part of this specification, in which similar characters of reference indicate corresponding parts in all the views.

Figure 1 is a side elevation of the tire as applied to a portion of an automobile wheel;

Fig. 2 is an enlarged cross section of the same on the line 2—2 of Fig. 1;

Fig. 6 is an enlarged cross section of the same on the line 6—6 of Fig. 5; and

Figure 3:
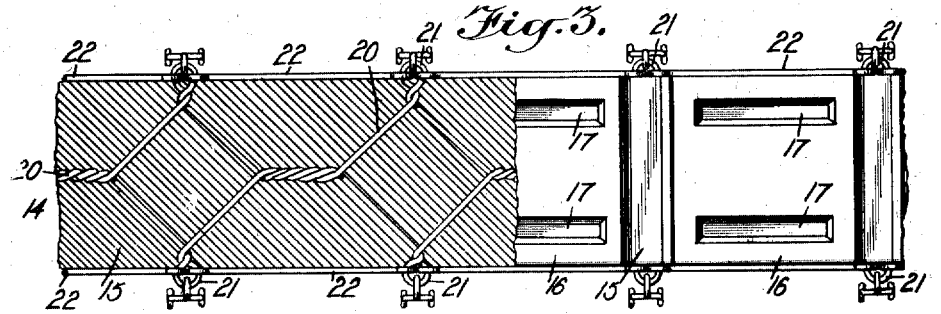
Fig. 3 is a plan view of the removable tread with part in section on the line 3—3 of Fig. 1.

An inner inflatable tube 10 is inclosed in a shoe 11 attached in the usual manner to the rim 12 of a felly 13 of an automobile or other vehicle wheel. The peripheral face of the shoe 11 is overlaid by a removable rubber tread 14 having a base 15 and spaced blocks 16 rising integrally from the said base 15. The outer face of each block 16 is provided with recesses 17, of various shapes, as shown in Figs. 3, 4 and 5, and the under side of the base 15 is concave to fit the peripheral face of the shoe 11 at the time the tube 10 is in inflated condition.

Figure 7:
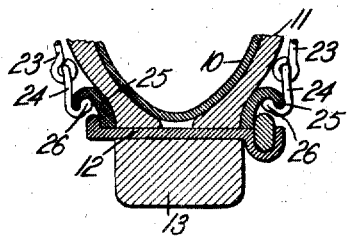
Fig. 7 is a cross section of a modified form of rim.

In order to securely and removably fasten the tread 14 in position on the peripheral face of the shoe 11, the following attaching device is provided: In the base 15 of the tread 14 is embedded a transversely extending member 20 terminating in eyes 21 exterior of the sides of the tread 14, preferably at the portions between the adjacent ends of successive blocks 16, as plainly indicated in the drawings. The eyes 21 at each side of the tread are connected with each other by longitudinal members 22 fitting against the corresponding sides of the tread 14. From each of the eyes 21 extends a flexible member 23, preferably in the form of a chain, disposed radially and overlying the corresponding side of the shoe 11. Each of the flexible members 23 terminate at its inner end in a hook 24 engaging a channel ring 25, which may form an integral part of the rim 12, as shown in Figs. 2 and 6, or a removable part, as illustrated in Fig. 7. The terminal 26 of each hook 24 is enlarged and fits a correspondingly shaped channel in the ring 25 so that the hook 24 is not liable to become accidentally detached from the channel ring 25. The channel ring 25 is provided with one or more notches 27 (see Fig. 1) to permit of conveniently passing the enlarged end 26 of the hooks 24 into the corresponding channel ring 25. It is understood that after an enlarged end 26 has passed into the channel ring 25 the tread and its attaching means are shifted on the shoe 11 to move the hook away from the notches 27 and to allow of engaging the hook successively with the notches 27 for engagement with the channel ring 25. It is understood that the tread is attached to the shoe 11 at the time the tube 10 is deflated to permit convenient engagement of the hooks 24 with the channel ring 25, as above explained, and then the inner tube 10 is inflated to extend the shoe 11 and to draw the flexible members 23 taut on both sides of the shoe. When it is desired to remove the tread 14 for replacing it by a new one in case it is worn out or for other purposes, then the tube 10 is deflated, after which the tread is shifted relatively to the tire 11 to bring the hooks 24 successively into register with the notches 27 for disengaging the hooks from the channel ring 25.

The transverse members 20 and the longitudinally connecting members 22 may be made in various shapes; for instance, as shown in Figs. 2 and 3, the transverse members 20 are made of wire twisted together at intervals and forming squares between adjacent twists, the side corners of the squares terminating in the eyes 21. It will be noticed that this member 20 strongly reinforces the tread 14 and at the same time forms a convenient means for attaching the connecting members 22 and the radial members 23 to the eyes 21.

Figure 4:
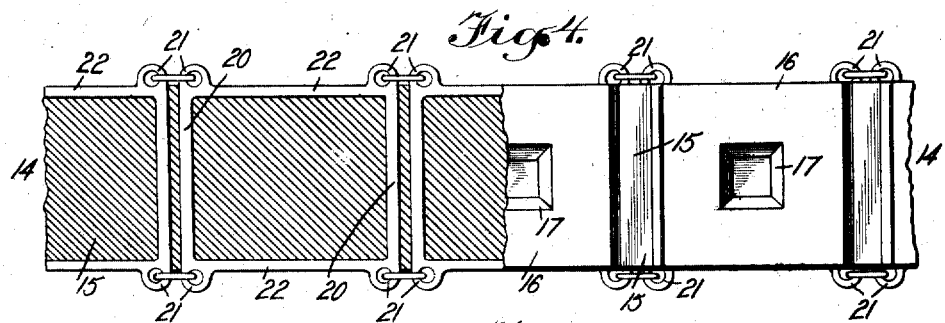
Fig. 4 is a similar view of a modified form of the removable tread.
Figure 5:
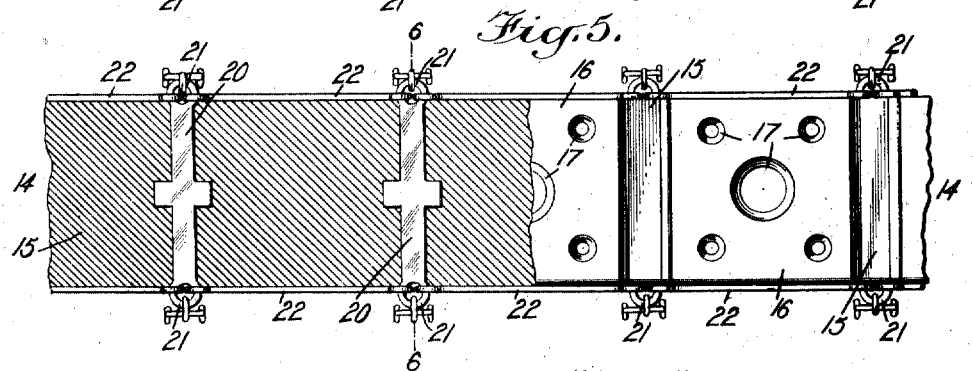
Fig. 5 is a similar view of another modified form of the removable tread.

As shown in Fig. 4, the transverse members 20 and the side members 22 are in the form of rectangular frames embedded in the tread 14 and provided at their corners with the eyes 21 for engagement by the outer ends of the radial members 23.

In the modified form shown in Fig. 5, the transverse members 20 are in the form of plates terminating in eyes 21 engaged by the side members 22 and the radial members 23.

From the foregoing it will be seen that by the arrangement described, the tread is removably attached to the peripheral face of the shoe and can be conveniently placed in position or removed whenever it is desired to do so.

It will also be noticed that by the construction above set forth the tread is strongly reinforced and it relieves the shoe of all undue strain as the connection of the tread is with the channel rings 25 of the rim of the wheel.

It will further be noticed that the connecting eyes 21 are located between adjacent blocks 16 to give the tread the desired resiliency when pressure is applied and without unduly bending the reinforcing members.

Having thus described my invention, I claim as new and desire to secure by Letters Patent:

1. In a pneumatic tired wheel, a tread having eyes at its sides, chains having hooks at their ends, the hooks at the outer ends engaging the eyes, the hooks at the inner ends of the chains having enlarged ends, and a rim having longitudinal channel rings at its sides with which the said lower hooks engage, the channel rings being notched to permit the engagement of the said hooks with the rings.

2. In a pneumatic tired wheel, a tread, chains secured to the tread and provided at their inner ends with hooks having enlarged ends, and a rim having longitudinal channel rings at sides with which the hooks of the chains engage, the said rings being notched to permit the engagement of the hooks with the rings.

In testimony whereof I have signed my name to this specification in the presence of two subscribing witnesses.

THADDIOUS V. ELLIOTT.

Witnesses:
   THEO. G. HOSTER,
   PHILIP D. ROLLHAUS.